United States Patent
Schreyer et al.

[15] 3,699,217
[45] Oct. 17, 1972

[54] PROCESS FOR THE PRODUCTION OF HYDROGEN PEROXIDE

[72] Inventors: Gerd Schreyer, Grossauheim; Otto Weiberg, Neu-Isenburg; Wolfgang Weigert, Offenbach, all of Germany

[73] Assignee: Deutsche Gold- und Silver Schneideanstalt vormals Roessler, Frankfurt (Main), Germany

[22] Filed: March 23, 1970

[21] Appl. No.: 22,000

[30] Foreign Application Priority Data

March 22, 1969 Germany..........P 19 14 739.8

[52] U.S. Cl...................................423/589, 260/369
[51] Int. Cl..........................C01b 15/02, C07c 49/68

[58] Field of Search .........................23/207; 260/369

[56] References Cited

UNITED STATES PATENTS 2,914,382   11/1959   Holmes et al................23/207

*Primary Examiner*—Oscar R. Vertiz
*Assistant Examiner*—Hoke S. Miller
*Attorney*—Cushman, Darby & Cushman

[57] ABSTRACT

Esters of trialkyl acetic acids; preferably pivalic acid, with higher alkanols, glycols, phenols or cycloalkanols are employed as solvents for the reaction carriers in the anthraquinone process for preparing hydrogen peroxide.

10 Claims, No Drawings

PROCESS FOR THE PRODUCTION OF HYDROGEN PEROXIDE

The present invention is directed to the continuous production of hydrogen peroxide by autoxidation of anthrahydroquinones with formation of the corresponding quinones, which then after separation of the hydrogen peroxide are again catalytically hydrogenated to hydroquinones. The quinones or hydroquinones are present in this process in dissolved form, that is in the so-called working solutions.

In general as solvents, there are added a mixture of a solvent for quinones and a solvent for hydroquinones. As the solvent for the quinone there is used single or polynuclear aromatic substances which can also be substituted. As the solvents for the hydroquinone there are used aliphatic, cycloaliphatic or aromatic alcohols, as well as their esters with straight chain fatty acids or phosphoric acid esters.

Thus, the solvent for the anthraquinone according to U.S. Pat. No. 2,215,883 consists for example of aromatic substances and aliphatic or cycloaliphatic alcohols; according to British Pat. No. 747,190 of alkylated benzene and fatty acid esters of cycloaliphatic alcohols. It is also known according to German Pat. No. 834,094 to use as the solvent a mixture of trisubstituted organic phosphoric acid esters and ethers or hydrocarbons.

The working solution is exposed during the process conditions, which places severe requirements on it. Prerequisites for usefulness include the following properties:

1. The working solution for the economical production of hydrogen peroxide concentrations must have as a high as possible dissolving power for the quinone and after the hydrogenation for the hydroquinone.
2. The working solution may not be irreversibly changed either in the hydrogenation or the oxidation step of the process.
3. The working solution must be stable to hydrogen peroxide.
4. The working solution must be stable to water.
5. The decomposition products which occur must be either easily regeneratable or removable or they must not disturb the process.
6. In the isolation of the hydrogen peroxide by extraction the density of the working solution must be sufficiently different from that of water or the aqueous hydrogen peroxide solution.

Further requirements for operating dependability can also be added as for example the highest possible boiling point (flash point), low viscosity, etc.

The known working solutions only partially correspond to these requirements.

It has now been found that there can be used as solvents for the reaction carrier in the anthraquinone process esters of fatty acids with α-tertiary carbon atoms (neo-alkanoic acids or trialkyl acetic acids) of the formula

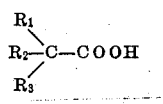

in which $R_1$ is an alkyl group of one to 10 carbon atoms and $R_2$ and $R_3$ are alkyl groups with one to two carbon atoms with higher aliphatic or cycloaliphatic alcohols, phenols or glycols alone or in mixture with alkyl substituted aromatic hydrocarbons or mixtures with a preponderant proportion of an alkyl substituted aromatic hydrocarbon, as well as phenyl ethers or polyphenyls or their mixtures. When the α-tertiary carbon atom fatty acid ester is used in admixture with other solvents the ester is usually 17 to 83 percent of the total mixture.

As aromatic hydrocarbons there can be used di-, tri- and tetraalkylbenzenes, corresponding to hydrocarbon mixtures with boiling points above 170° C. Especially suitable is a mixture which boils at 180° to 260° C. Of the individual hydrocarbons, there have proven especially suitable for example tetramethyl benzene, dimethyl ethyl benzene and diethyl benzene. Any of the isomers can be used which are liquids under the conditions of the anthraquinone process, e.g. isodurene, prehnitene, pseudocumene, hemimellitene, n-butylbenzene, p-cymene, 1,3,5,-triethylbenzene, 1,3-diethylbenzene, 1,4-diethylbenzene.

As phenyl ethers especially suitable is diphenyl oxide, as polyphenyls, diphenyl, diphenyl methane and as a mixture of a phenyl ether and a diphenyl, especially the eutectic mixture of diphenyl oxide and diphenyl.

As the neoalkanoic acid to form the ester there can be used pivalic acid (trimethyl acetic acid), dimethyl propyl acetic acid, (2,2-dimethyl pentanoic acid), neodecanoic acid, neotridecanoic acid, 2,2,4,4-tetramethyl valeric acid.

As alcohols and phenols for forming esters with the neoalkanoic acid preferably there are used aliphatic saturated alcohols of six to 12 carbon atoms, e.g., n-hexyl alcohol, n-octyl alcohol, n-decyl alcohol, n-heptyl alcohol, n-nonyl alcohol, isooctyl alcohol, isodecyl alcohol, 2-ethylhexyl alcohol, as cycloaliphatic alcohols cyclohexyl alcohol, cyclopentanol, alkyl-cyclohexyl alcohols, e.g. 2-methyl cyclohexanol, 2-ethyl cyclohexanol, glycols such as ethylene glycol, propylene glycol, trimethylene glycol, 1,4-butylene glycol, 1,3-butylene glycol, 1,2-butylene glycol, phenols such as phenol, p-cresol, o-cresol, m-cresol, 2,4-xylenol, p-t-butyl phenol, resorcinol, phloroglucinol.

Specific examples of suitable esters are n-hexyl pivalate, n-octyl pivalate, n-decyl pivalate, isooctyl pivalate, isodecyl pivalate, 2-ethylhexyl pivalate, lauryl pivalate, octadecyl pivalate, cyclohexyl pivalate, 2-methylcyclohexyl pivalate, 2-ethylcyclohexyl pivalate, ethylene glycol dipivalate, propylene glycol dipivalate, 1,4-butylene glycol dipivalate, phenyl pivalate, p-tolyl pivalate, p-t-butyl pivalate, resorcinol dipivalate, cyclohexyl 2,2-dimethyl pentanoate, phenyl neodecanoate, n-octyl neotridecanoate, cyclopentyl pivalate.

The preferred esters are esters of trimethyl acetic acid (pivalic acid). Especially good results are obtained with the cyclohexyl ester or the methyl or ethyl cyclohexyl ester of pivalic acid. Also favorable were lauryl pivalate, phenyl pivalate and ethylene glycol oil-pivalate. These esters can also serve simultaneously as solvents for the quinones and hydroquinones.

As the anthraquinone compound there can be employed for example, alkyl derivatives of anthraquinone such as 2-methylanthraquinone 2-ethyl anthraquinone, 2-butyl anthraquinone, 2-isopropyl anthraquinone, 2-amyl anthraquinone, 2-sec. butyl anthraquinone, 2-t-butyl anthraquinone, 2-sec. amyl anthraquinone, 1,3-dimethyl anthraquinone, 2,3-dimethyl anthraquinone, 1,4-dimethyl anthraquinone, 2,7-dimethyl anthraquinone and mixtures of them, as well as partially nuclear hydrogenated alkylanthraquinones.

Unless otherwise indicated, all parts and percentages are by weight.

In the mixed solvents the ratio of quinone to hydroquinone dissolver is preferably from 1:5 to 5:1.

Besides the good solubility the technical advance of using the solvents of the invention lies in the favorable partition coefficient for hydrogen peroxide extraction between the solvent and water. Additionally these solvents are more resistant to saponification than, for example, acetic acid esters. The slight amounts of saponification products occurring eventually do not result in disturbing emulsions in the extraction as is the case in the use of phosphoric acid esters as, for example, trioctyl phosphate.

The solvents of the invention furthermore are oxidation resistant against molecular oxygen and hydrogen peroxide. Their viscosities and densities are low, particularly, in comparison to phosphoric acid esters.

Since their vapor pressure is lower than that of the acetates, there is present a solvent that meets all requirements of dependability.

EXAMPLE 1

Ethyl anthraquinone was dissolved in phenyl pivalate so that 1 liter of solution contained 120 grams of reaction carrier. This solution was hydrogenated with hydrogen at 48° C. in the presence of 1 gram of palladium black to such an extent that 50% of the quinone was present as hydroquinone. After separation of the catalyst and gasing with air by extraction with water there were isolated 8.5 grams of hydrogen peroxide.

EXAMPLE 2

For the following example there was used a working solution which contained 65 grams of ethyl anthraquinone and 55 grams of tetrahydroethyl anthraquinone.

As a mixed solvent there was used a mixture of 50 volume percent cyclohexyl pivalate and 50% of alkyl benzenes having a boiling point between 180° and 220° C.

The working solution was hydrogenated with hydrogen in the presence of 1 gram of palladium black as a catalyst at 45° C. to such an extent that 45% of the quinone was present as hydroquinone.

After filtering off the hydrogenation catalyst the hydroquinone was reconverted to quinone by gasing the solution with air and at the same time hydrogen peroxide was formed. A subsequent extraction with a 1/25 fraction of the working solution of water gave a 16.2% solution of hydrogen peroxide in water. The yield based on the hydrogen consumed was over 99%.

What is claimed is:

1. In a process for the production of hydrogen peroxide by the anthraquinone process in which the anthraquinone containing working solution is recycled through a series of steps including hydrogenation, oxidation and extraction for the recovery of the hydrogen peroxide produced the improvement comprising using as at least a portion of the solvent for the anthraquinone or hydroquinone used as the reaction carrier as ester of (1) a fatty acid having a tertiary carbon atom in the alpha position and having the formula

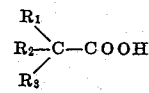

where $R_1$ is alkyl of one to 10 carbon atoms and $R_2$ and $R_3$ are alkyl groups of one to two carbon atoms and (2) a hydroxy compound selected from the group consisting of higher aliphatic monohydric alcohols, cycloaliphatic alcohols, phenols and glycols.

2. A process according to claim 1 wherein the ester is the sole solvent.

3. A process according to claim 1 where the ester is employed as the hydroquinone solvent and there is employed as the quinone solvent a member of the group consisting of alkyl substituted aromatic hydrocarbons, phenyl ethers and polyphenyls.

4. A process according to claim 3 wherein the proportions of quinone solvent to hydroquinone solvent are from 1:5 to 5:1.

5. A process according to claim 4 wherein the ester is a pivalic acid ester.

6. A process according to claim 5 wherein the solvent is a solvent mixture including alkyl benzenes boiling at 180° C. to 220° C. as the quinone solvent and cyclohexyl or methylcyclohexyl-pivalate as the hydroquinone solvent.

7. A process according to claim 5 wherein the solvent mixture includes the eutectic mixture of diphenyl and diphenyl oxide as the quinone solvent and cyclohexyl or methyl cyclohexyl pivalate as the hydroquinone solvent.

8. A process according to claim 1 wherein the ester is a pivalic acid ester.

9. A process according to claim 8 wherein the pivalate ester is an ester of a member of the group consisting of alkanols having six to 12 carbon atoms, cyclohexanol, lower alkyl cyclohexanols, unsubstituted lower glycols and unsubstituted phenols.

10. A process according to claim 3 wherein the ester is 17 to 83% of the total solvent mixture.

* * * * *